United States Patent Office 3,245,751
Patented Apr. 12, 1966

3,245,751
TEXTILE FIBERS HAVING IMPROVED DYEABILITY AND METHOD OF PREPARING SAME
Alberto Bonvicini, Terni, Italy, assignor to Montecatini Società Generale per l'Industria Mineraria e Chimica, Milan, Italy
No Drawing. Filed May 20, 1963, Ser. No. 281,829
Claims priority, application Italy, May 24, 1962, 10,342/62
10 Claims. (Cl. 8—100)

The present invention relates to the preparation of textile fibers and of films, tapes, shaped articles and the like, from polyolefins consisting essentially of isotactic macromolecules and obtained by low pressure polymerization with stereospecific catalysts, which fibers are unusually receptive to various types of dyes.

More particularly, the present invention relates to the preparation of dyeable textile fibers by the extrusion of a mixture of a polyolefin and a basic nitrogen polycondensate, and to the post-treatment of the resulting fibers.

The polyolefin is obtained by the stereospecific polymerization of a monomer of the formula $$R-CH=CH_2$$

in which R is an alkyl or aryl group or a hydrogen atom. Thus suitable polyolefins include polyethylene, propylene, polybutene-1, polypentene-1, poly-4-methylpentene, polystyrene and the like. A preferred polyolefin is polypropylene, obtained by the stereospecific polymerization of propylene and consisting essentially of isotactic macromolecules, e.g., as defined by Natta, U.S. Patent 2,882,263.

Various processes for preparing fibers from polyolefins have been described heretofore. These fibers have remarkable mechanical characteristics but do not exhibit a very high receptivity for dyes.

The present invention provides a process for preparing fibers of polyolefins, which fibers exhibit unusual receptivity to dyes and a remarkable dye fastness.

I have surprisingly found that textile fibers having an affinity for dyes and being obtained by extruding a mixture of polyolefin with from about 1 to 25% by weight of a basic nitrogen polycondensate, are rendered particularly receptive and exhibit a remarkable color fastness, particularly to washing and rubbing, by treatment thereof with a solution of polyvinyl alcohol and an aldehyde.

The solutions used according to this invention should desirably have a concentration of polyvinyl alcohol from 0.1 to 10% by weight, and an aldehyde concentration of from about 0.2 to 20% by weight.

The method of the present invention is generally applied to polyolefin fibers modified by the addition of a basic nitrogen compound. The method is preferably applied to fibers of polypropylene modified by the addition (before spinning) of basic polycondensates of epichlorohydrin, such as octadecylamine/epichlorohydrin/piperazine polycondensates and the like, as well as polycondensates of diglycidylamines with amines and diamines, of dihalogen-derivatives with bis-secondary diamines, etc. Other basic nitrogen compounds which can be employed include polyalkylenimines, and polyvinylpyridines.

The treatment of the present invention may be carried out before or after stretching. Such treatment is carried out at a temperature of from about room temperature to 100° C., for a period of time of from about 2–3 seconds to a few hours.

Suitable aldehydes include formaldehyde, acetaldehyde, propionaldehyde, acrylaldehyde, butyraldehyde, and the like.

The fibers and the other manufactured articles can also be subjected to an acid treatment, more particularly with sulfuric acid, which further improves their dyeability and their color fastness.

The fibers obtained by virtue of the present invention exhibit a remarkable receptivity to acid dyes, metallized dyes, and disperse dyes. They also exhibit a good affinity for basic dyes and vat dyes.

The control dyeing tests were carried out for 1 hour and a half at the boiling point, in baths containing 2.5% of dye by weight of the fibers, with a fiber/bath ratio of 1:40.

Dyeing with acid and metallized dyes was carried out in the presence of 3% ammonium acetate (calculated on the fiber weight) and of 1% of a surface-active agent, for example, the condensation product of ethylene oxide with octylphenol having a molecular weight of about 450.

After 30 minutes from the commencement of the boiling 2% (calculated on the fiber weight) of a 20% acetic acid solution was added in order to improve the exhaustion of the baths.

TABLE

|  | Ex. 1 | Ex. 2 | Ex. 3 |
|---|---|---|---|
| Composition of the stretched fibers: |  |  |  |
|   Polypropylene, [η]=1.51; ash content=0.01%; residue after heptane extraction=97.2% | 95% | 95% | 96.7%. |
|   Octadecylamine/epichlorohydrin/piperazine polycondensate (mol ratio=0.3/1.3/1) [η$_\text{nF}$]=0.31; M.P. 62° C. | 5% |  |  |
|   Dodecylamine/epichlorohydrin/piperazine polycondensate (0.3/1.3/1) [η$_\text{nF}$]=0.30; M.P.=54° C |  | 5% |  |
|   Epichlorohydrin/piperazine polycondensate (1/1) [η$_\text{nF}$]=0.40; M.P.=172° C |  |  | 3.3%. |
| Finishing treatment: |  |  |  |
|   Immersion at 25° C. for 1 minute in a bath containing— |  |  |  |
|     Polyvinyl alcohol | 1% |  | 0.5%. |
|     Formaldehyde | 3.5% |  | 2%. |
|   Immersion at 95° C. for 5 minutes in a bath containing— |  |  |  |
|     Polyvinylalcohol |  | 1.5% |  |
|     Formaldehyde |  | 3.5% |  |
| Dyeing | 30′/110° C | 30′/110° C | 30′/110° C. |
| Dyeing with acid dyes: |  |  |  |
|   Alizarine yellow 2G (C.I. Mordant yellow 1) | Good | Good | Good. |
|   Wool red B (C.I. acid red 115) | do | do | Do. |
|   Alizarine red S (C.I. mordant red 3) | do | do | Do. |
|   Alizarine blue SE (C.I. acid blue 43) | do | do | Do. |
|   Acid black JVS (C.I. acid black 1) | do | do | Do. |
| Dyeing with metallized dyes: |  |  |  |
|   Lanasyn yellow GLN (C.I. acid yellow 112) | do | do | Do. |
|   Lanasyn red GL (C.I. acid red 216) | do | do | Do. |
|   Lanasyn brown 3RL (C.I. brown 30) | do | do | Do. |
| Dyeing with disperse dyes: |  |  |  |
|   Setacyl yellow 3C (C.I. disperse yellow 20) | do | do | Do. |
|   Cibacet scarlet BR (C.I. disperse red 18) | do | do | Do. |
|   Brilliant setacyl blue BG (C.I. disperse blue 3) | do | do | Do. |
| Fastness to washing and rubbing of colors obtained with acid dyes | do | do | Do. |
| Fastness to washing and rubbing of colors obtained with metallized dyes | do | do | Do. |
| Fastness to washing and rubbing of colors obtained with disperse dyes | do | do | Do. |

Dyeing with disperse dyes was carried out in the presence of 2% of the same surface active agent as above, by weight of the fiber.

After dyeing, the fibers were rinsed with running water, and exhibited intense colors with acid, metallized and disperse dyes.

The color fastness to light, washing and rubbing was very satisfactory.

Variations and modifications can, of course, be made without departing from the spirit and the scope of the invention.

The examples shown above will further illustrate the invention. In these examples $[\eta]$ indicates the polymer intrinsic viscosity measured in tetralin at 135° C.; $[\eta_{SP}]$ the specific viscosity of the condensate, determined on a 5% benzene solution of the condensate at 25° C. in a viscosimeter of the 100 Fenske type; and M.P. the melting point of the condensate.

Having thus described the invention, what is desired to be secured and claimed by Letters Patent is:

1. A method of improving the dye receptivity and dye fastness of fibers obtained by molten mass extrusion of a mixture of a polyolefin and a basic nitrogen compound, this method comprising treating said fibers with a solution containing polyvinyl alcohol and an aldehyde for a time of from about 2–3 seconds to 24 hours at a temperature of from about room temperature to the boiling point of the solvent for said polyvinyl alcohol and aldehyde.

2. The method of claim 1 wherein said treatment is effected by immersing said fibers in said solution.

3. The method of claim 1 wherein said polyolefin is polypropylene prepared with the aid of stereospecific catalysts and consisting essentially of isotactic macromolecules.

4. The method of claim 1 wherein said aldehyde is selected from the group consisting of formaldehyde, acetaldehyde, propionaldehyde, acrylaldehyde, and butyraldehyde.

5. Textile fibers in the form of mono- and plurifilaments, staple fibers, simple and bulky yarns, films, tapes, and other shaped articles, obtained by the method of claim 1.

6. The method of claim 1 wherein the amount of basic nitrogen compound in said mixture is from about 1 to 25% by weight of said mixture and wherein said basic nitrogen compound is a polycondensate of epichlorohydrin with an amine.

7. The method of claim 6 wherein said basic nitrogen polycondensate is prepared by the reaction of epichlorohydrin with piperazine.

8. The method of claim 7 wherein said basic nitrogen polycondensate is prepared by the reaction of epichlorohydrin piperazine, and another amine.

9. The method of claim 8 wherein said nitrogen polycondensate is prepared by the reaction of epichlorohydrin, piperazine, and octadecylamine.

10. The method of claim 8 wherein said nitrogen polycondensate is prepared by the reaction of epichlorohydrin, piperazine and dodecylamine.

References Cited by the Examiner

UNITED STATES PATENTS

| | | | |
|---|---|---|---|
| 2,234,905 | 3/1941 | Tallis | 8—100 |
| 2,418,696 | 4/1947 | Cameron et al. | 8—100 |
| 3,090,769 | 5/1963 | Coover et al. | 8—100 X |
| 3,107,228 | 10/1963 | Cappuccio et al. | 260—45.5 |
| 3,151,928 | 10/1964 | Cappuccio et al. | |

NORMAN G. TORCHIN, *Primary Examiner.*